T. L. RANKIN.
ICE-MACHINES.
No. 171,168. Patented Dec. 14, 1875.
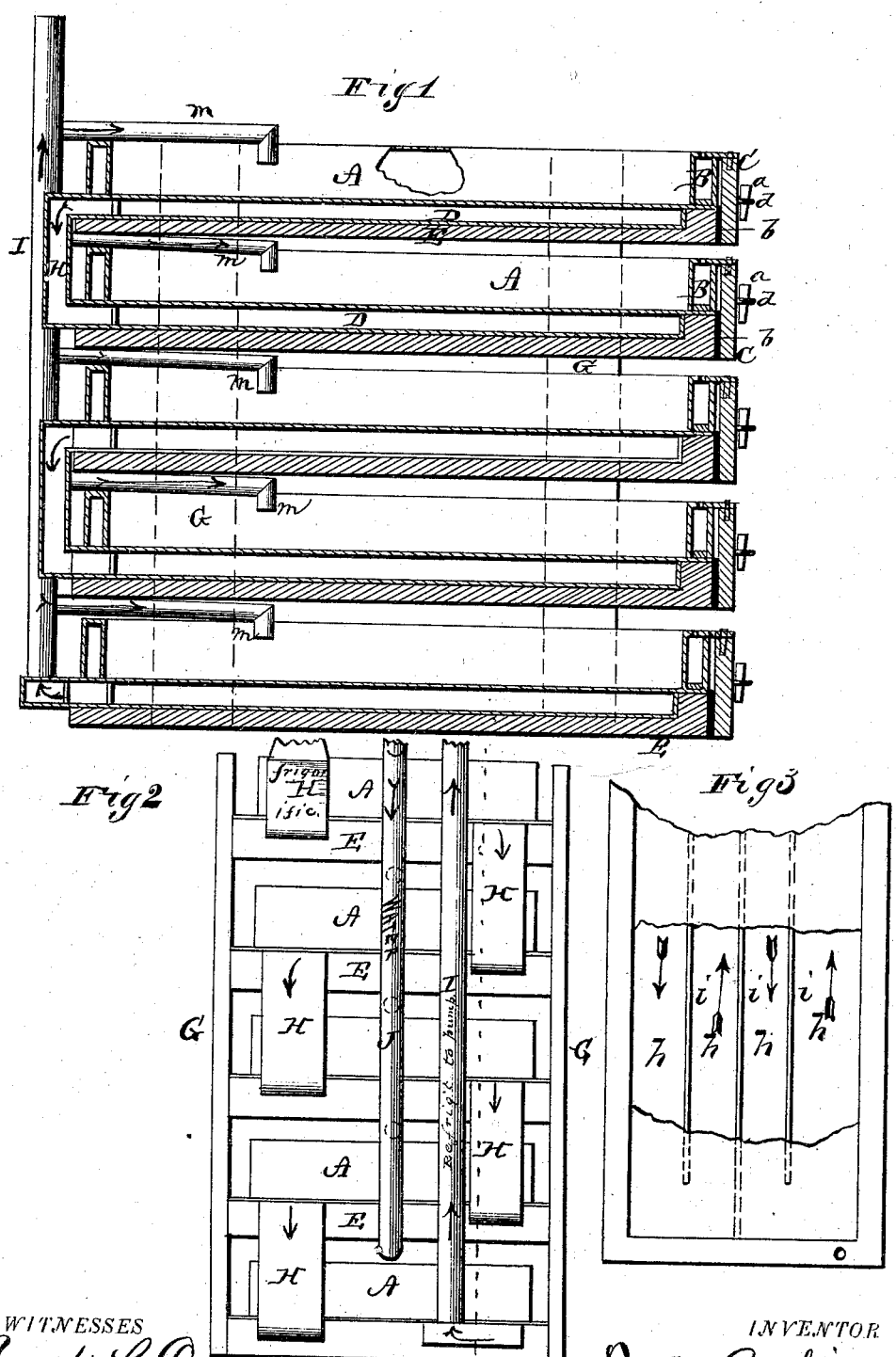

UNITED STATES PATENT OFFICE.

THOMAS L. RANKIN, OF EMPORIA, KANSAS.

IMPROVEMENT IN ICE-MACHINES.

Specification forming part of Letters Patent No. 171,168, dated December 14, 1875; application filed November 4, 1875.

*To all whom it may concern:*

Be it known that I, THOS. L. RANKIN, of Emporia, in the county of Lyon and in the State of Kansas, have invented certain new and useful Improvements in Ice-Machines; and do hereby declare that the following is a full, clear, and exact description thereof, reference being had to the accompanying drawings, and to the letters of reference marked thereon, making a part of this specification.

The nature of my invention consists in the construction and arrangement of a freezing-tank for ice-machines, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my freezing-tank. Fig. 2 is an end elevation of the same. Fig. 3 shows the interior arrangement of the chamber under the bottom of one of the pans in the freezing-tank.

The freezing-tank is composed of a series of pans, A A, one above the other, each pan being made with double sides and bottom, and with one end, B, made movable, so as to be taken out for the removal of the ice when frozen in the pan. This end piece B is attached to a wood side, C, and which is provided with rubber packing b, as shown, to make a water-tight joint; and it is then fastened by means of staples d and wedges a, as shown in Fig. 1. The hollow metallic portion of the end piece B is shorter than the wooden part C, and sets in between the metal parts of the sides of the pan, while the wooden part C overlaps the ends of the sides of the pan. The double bottom of each pan forms a chamber, D, which is placed upon and within a wooden bottom, E, to prevent evaporation, and the wooden bottoms are connected by vertical bars G G fastened thereto in such a manner that there will be a suitable space left between the top of each pan and the bottom of the one immediately above it. The chamber D, within the bottom of each pan, is provided with longitudinal partitions $i$ $i$, which form a tortuous or winding passage, $h$, through which the freezing-liquid is passed. This liquid is admitted into the chamber of the top pan at one end of the passage $h$, and at the other end it passes through a pipe, H, to one end of the passage in the chamber of the next pan, and so on into and through the chambers of all the pans. From the last pan it is pumped up through a pipe, I, to the supply-tank again. When the water in the pans has been frozen into solid cakes of ice all the freezing-liquid is pumped out of the chambers under the pans and hot water is allowed to pass through the same, which loosens the ice in the pans and admits of its easy removal therefrom. Fresh water to be frozen is admitted into the pans A through a pipe, J, provided with a branch pipe, $m$, over each pan.

Having thus fully described my invention, what I claim as new, and desire to secure by Letters Patent, is—

1. The combination of the pan A, removable end piece B, with wooden side C, rubber packing b, staples d, and wedge-keys a, all substantially as and for the purposes herein set forth.

2. The combination of the pans A, having chambers D in their bottoms, with tortuous passages $h$, the wooden bottoms E, connecting-pipes H, and inlet and outlet pipes H I, substantially as and for the purposes herein set forth.

In testimony that I claim the foregoing I have hereunto set my hand this 20th day of October, 1875.

THOS. L. RANKIN.

Witnesses:
 J. S. CLIFTON,
 J. M. COOK.